United States Patent [19]

Hillman

[11] 4,381,374

[45] Apr. 26, 1983

[54] HALOGENATION OF BUTADIENE POLYMERS IN MIXED SOLVENTS

[75] Inventor: Patrick E. Hillman, Corpus Christi, Tex.

[73] Assignee: PPG Industries, Inc., Pittsburgh, Pa.

[21] Appl. No.: 320,983

[22] Filed: Nov. 12, 1981

[51] Int. Cl.³ .............................................. C08F 8/22
[52] U.S. Cl. ................................... 525/356; 525/357
[58] Field of Search .............................. 525/356, 357

[56] References Cited

U.S. PATENT DOCUMENTS

| | | | |
|---|---|---|---|
| 2,581,927 | 1/1952 | Briant | 525/356 |
| 2,980,656 | 4/1961 | Jones et al. | 260/85.1 |
| 3,293,226 | 12/1966 | De Schrijver | 260/85.1 |
| 3,392,161 | 7/1968 | Uelzmann | 260/94.7 |
| 3,798,291 | 3/1974 | Dall'Asta et al. | 260/931 |

FOREIGN PATENT DOCUMENTS 40-16675  7/1965  Japan ................................. 525/356

OTHER PUBLICATIONS

S. Crawley and I. C. McNeill, "Preparation and Degradation of Head-to-Head PVC," *Journal of Polymer Science*, vol. 16, pp. 2593–2606 (1978).

N. Murayama and Y. Amagi, "On Head-to-Head Poly(vinyl chloride) and Poly(vinylidene chloride)," *Polymer Letters*, vol. 4, pp. 119–125 (1966).

*Primary Examiner*—Stanford M. Levin
*Attorney, Agent, or Firm*—George D. Morris

[57] ABSTRACT

Polybutadiene having high cis-1,4-configuration and dissolved in substantially anhydrous liquid organic solvent is reacted with chlorine, bromine or a mixture thereof. The solvent consists essentially of a mixture of one or more perhalogenated alkanes and one or more partially halogenated alkanes and fine particles of substantially thermoplastic halogenated polybutadiene precipitate from the solvent. The fine particles are separated from the bulk of the solvent.

24 Claims, No Drawings

HALOGENATION OF BUTADIENE POLYMERS IN MIXED SOLVENTS

The halogenation of butadiene polymer is usually accomplished by reacting the butadiene polymer, dissolved in a substantially anhydrous organic solvent, with chlorine, bromine or a mixture thereof. In choosing the organic solvent in which to conduct the reaction, one has heretofore been faced with a dilemma. If the organic solvent were chosen such that the chlorinated polymer precipitated during the reaction, the precipitated polymer was found to be highly crosslinked. In other words, precipitation was primarily induced by crosslinking. On the other hand, if the solvent were chosen in order to produce a substantially thermoplastic polymer, that is, one having negligible crosslinking, the product polymer remained dissolved in the solvent, making separation difficult. In the latter case, various methods have been used to isolate the halogenated polymer. In one such method, the solution has been evaporated to dryness, but this consumes untoward amounts of energy and time and in any commercially feasible operation requires sophisticated equipment to recover the evaporated solvent. In another method, the solution has been admixed with a liquid nonsolvent to precipitate the polymer which is separated from the liquid, usually by filtration or centrifugation. This, however, requires further treatment of the filtrate, typically by distillation, to remove the nonsolvent before the solvent can be recycled. Again, energy must be expended and equipment provided to effect the separation.

The present invention serves to alleviate the above dilemma by permitting fine particles of substantially thermoplastic halogenated butadiene polymer to precipitate from the solvent. Accordingly, in a process for producing substantially thermoplastic halogenated butadiene polymer wherein butadiene polymer dissolved in liquid organic solvent is reacted with chlorine, bromine or a mixture thereof, the invention is the improvement wherein (a) the solvent consists essentially of a mixture of one or more perhalogenated alkanes having one to about two carbon atoms and one or more partially halogenated alkanes having one to about two carbon atoms, (b) fine particles of said substantially thermoplastic halogenated butadiene polymer having a solubility index of at least about 50 precipitate from the solvent during the reaction, and (c) the precipitated fine particles are separated from the bulk of the solvent. The solvent may then be recycled to the process.

Examples of perhalogenated alkanes which may be used include carbon tetrachloride, trichlorofluoromethane, dichlorodifluoromethane, chlorotrifluoromethane, bromotrifluoromethane, 1,1,2-trichloro-1,2,2-trifluoroethane and 1,2-dichloro-1,1,2,2-tetrafluoroethane. The preferred perhalogenated alkane is carbon tetrachloride.

Examples of partially halogenated alkanes which may be used include methyl chloride, methylene chloride, chloroform, methyl bromide, chlorodifluoromethane, ethyl chloride and ethylene dichloride. The preferred partially halogenated alkanes are methylene chloride, chloroform, and mixtures thereof; methylene chloride is especially preferred.

Minor amounts of other solvating materials may also be present in the solvent so long as they do not significantly adversely affect the function of the solvent or the production or precipitation of the substantially thermoplastic halogenated butadiene polymer.

The proportions of perhalogenated alkanes and partially halogenated alkanes present in the solvent are subject to wide variation and depend in large measure upon the identities of the materials used. Fundamentally, the identities and proportions of these materials should be such that substantially thermoplastic halogenated butadiene polymer is produced and precipitated from the solvent during the reaction. Ordinarily, the volumetric ratio of perhalogenated alkane to partially halogenated alkane in the liquid solvent is in the range of from about 0.4:1 to about 8:1.

The preferred solvent consists essentially of carbon tetrachloride and methylene chloride, especially at a volumetric ratio of about 4:1.

The butadiene polymer starting material is itself known. It may be a homopolymer of butadiene, or it may be an interpolymer, block polymer or graft polymer based on butadiene and one or more other monomers or polymers. In the case of interpolymers, block polymers and graft polymers, it is preferred that they be based in major molar amount on butadiene. Mixtures of butadiene polymers may be used where desired. The weight average molecular weight of the butadiene polymer is subject to wide variation, but it is usually in the range of from about 25,000 to about 1,000,000. Often the weight average molecular weight is in the range of from about 40,000 to about 800,000. It is preferred that the weight average molecular weight be in the range of from about 200,000 to about 500,000.

Many, but not all, butadiene polymers may be employed as starting materials in the practice of the invention. The suitability of any particular butadiene polymer may be easily ascertained by a simple test in which the butadiene polymer is agitated with liquid organic solvent in one container and the corresponding substantially thermoplastic halogenated butadiene polymer is agitated with solvent of the same composition in another container. The relative concentrations of polymer and solvent, the identity of the particular solvent and the temperatures employed during agitation should correspond to those to be used in practicing the present invention. If the butadiene polymer dissolves and the substantially thermoplastic halogenated butadiene polymer is relatively insoluble, the former polymer is suitable as a starting material.

The preferred butadiene polymer starting material is polybutadiene which has at least about 90 mole percent cis-1,4-configuration. Often such high cis polybutadiene has at least about 95 mole percent cis-1,4-configuration, and sometimes it has at least about 99 mole percent cis-1,4-configuration.

The initial concentration of the butadiene polymer in the solvent solution may be varied considerably. The initial concentration should be high enough so that halogenated butadiene polymer will precipitate during the reaction. It should not be so high, however, that significant amounts of butadiene polymer are either not dissolved or are precipitated during the reaction. While the numerical value will depend in part upon the identity of the solvent, usually the initial concentration of butadiene polymer in the solution is in the range from about 0.1 to about 10 weight percent. Typically the concentration is in the range of from about 0.5 to about 5 weight percent. From about 1 to about 3 weight percent is preferred.

The reaction is conducted in the liquid phase, either with or without boiling of the solvent at the prevailing pressure employed. In general, as the temperature is increased from a low value, the degree of halogenation by substitution of halogen for hydrogen in the butadiene polymer increases. For example, at temperatures on the order of 0° C., the halogenation of high-cis polybutadiene is essentially all by addition to the double bonds. At temperatures above about 56° C., halogenation by substitution becomes significant. At still higher temperatures the degree of halogenation by substitution becomes greater. While the temperature may be widely varied depending upon the degree and type of halogenation desired, it is generally in the range of from about −10° C. to about +150° C. Temperatures in the range of from about 0° C. to about 85° C. are typical. Temperatures in the range of from about 0° C. to about 60° C. are preferred.

The pressure employed is susceptible to wide variation. Subatmospheric pressures may be, but are only rarely used. Ordinarily, atmospheric or superatmospheric pressures are utilized. Typically, the pressure is in the range of from about 0 to about 500 pounds per square inch gauge. Pressures in the range of from about 0 to about 100 pounds per square inch gauge are frequently used. Preferred pressures are in the range of from about 0 to about 50 pounds per square inch gauge.

The reaction may be conducted either without catalyst or in the presence of catalyst. When used, the weight ratio of catalst to polybutadiene introduced is ordinarily in the range of from about 0.001:1 to about 0.03:1. Typically the weight ratio is in the range of from about 0.005:1 to about 0.015:1. Examples of catalyst which may be used include triethyl aluminum, diethyl aluminum chloride, ethyl aluminum dichloride, ethyl aluminum sesquichloride and aluminum trichloride. Mixtures of catalysts may be used if desired.

While the butadiene polymer may be halogenated using chlorine, bromine or a mixture of chlorine and bromine, chlorine is the preferred halogenating agent.

The reaction may be conducted continuously, semi-continuously or batchwise.

When the reaction has been completed, or even while it is underway, the precipitated substantially thermoplastic halogenated butadiene polymer is easily separated from the bulk of the liquid phase. This is usually accomplished by filtration, by centrifugation, or by gravity segregation into layers followed by separation of the layers. The residual solvent may be removed from the product by any of several procedures, including drying, washing followed by drying, and steam distillation followed by drying.

The separated liquid phase may be recycled to the halogenation process. Little or no purification of the separated liquid phase is ordinarily required prior to recycling. However, especially when catalyst is employed, it is generally beneficial to wash the separated liquid phase with water or dilute caustic solution and to separate the organic and aqueous phases prior to recycling the organic phase. Ordinarily the organic phase is not dried, although it may be dried when desired.

In some cases, a portion of the partially halogenated alkane may be halogenated to perhalogenated alkane during the halogenation of the butadiene polymer. For example, where high-cis polybutadiene is chlorinated in a solvent containing carbon tetrachloride and either methylene chloride or chloroform, some methylene chloride or chloroform may be chlorinated to carbon tetrachloride. In the present process this is not detrimental since perhalogenated alkane is a necessary constituent of the solvent. Where it is desired to recycle solvent in which some of the partially halogenated alkane has been halogenated to perhalogenated alkane, the appropriate amount of partially halogenated alkane may be introduced as makeup.

Similarly, in some cases where the partially halogenated alkane contains two or more hydrogen atoms, a portion of the partially halogenated alkane may be halogenated to higher partially halogenated alkane during halogenation of the butadiene polymer. For example, where high-cis polybutadiene is chlorinated in a solvent containing carbon tetrachloride and methylene chloride, some methylene chloride may be chlorinated to chloroform. This likewise does not appear to be detrimental. When solvent recycle is used, the apropriate amount of the original partially halogenated alkane may be introduced as makeup. Removal of the higher partially halogenated alkane is ordinarily unnecessary.

Makeup perhalogenated alkane may be added as desired.

The halogen content of the product can vary widely, but it is usually in the range of from about 5 percent to about 80 percent by weight of the polymer. Typically the halogen content is in the range of from about 40 percent to about 70 percent by weight. A halogen content in the range of from about 50 percent to about 65 percent by weight is preferred, especially when the halogen is chlorine.

The substantially thermoplastic halogenated butadiene polymer produced by the process of this invention is not significantly crosslinked and is soluble in such solvents as benzene, acetone and dioxane. The solubility index is the percent of light transmitted by a one weight percent solution of the polymer in cyclohexanone relative to the light transmitted by pure cyclohexanone. A polymer solution having the same light transmission as pure cyclohexanone would therefore have a solubility index of 100. A Perkin Elmer Model 554 spectrophotometer using one centimeter cells and light with a wavelength of 600 nonometers is used in making these measurements. The solubility index is a measure of crosslinking; low values indicate crosslinking of the product leading to insolubility, whereas high values are indicative of low degrees of crosslinking. Halogenated polymers made in accordance with the present invention have solubility indices of at least about 50. The solubility index is often at least about 80 and preferably it is at least about 90.

There are many utilities for substantially thermoplastic halogenated butadiene polymers. When dissolved in suitable solvents they may be cast into various shapes such as films and sheets or they may be used in coating compositions. They may be molded, extruded or otherwise shaped into substantially any shape. They may be compounded with pigments, plasticizers, other polymers and additives customarily employed in the plastics industry. Halogenated butadiene polymers, for example, may be used for electrical cable coverings. When containing residual unsaturation they may be crosslinked, usually in the presence of initiator which provides free radicals; crosslinking monomers or oligomers may be present or absent as desired. The listing of optional ingredients discussed above is by no means exhaustive. Other ingredients may be used in their customary amounts for their customary purposes so long as they do not seriously interfere with good fabrication or coatings practice.

In the illustrative examples which follow, all parts are parts by weight and percentages are percent by weight unless otherwise specified.

EXAMPLE I

A 2 liter, 4-necked flask equipped with an agitator was charged with 1500 cubic centimeters of solvent consisting essentially of 13 volumetric parts of methylene chloride and 87 volumetric parts of carbon tetrachloride. Fifty grams of polybutadiene having a weight average molecular weight in the range of from 200,000 to 300,000 and having 98 mole percent cis-1,4-configuration was added in small pieces and dissolved in the solvent. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 22° C. A water bath was brought up to the flask and the addition of chlorine through the gas feed tube at a rate of 4.884 grams per minute was begun. Ten minutes later the temperature was 50° C. After a further 77 seconds the temperature was 50° C. and a precipitate was noticeable. After yet a further 153 seconds, the temperature was 47° C. At this time the addition of chlorine was terminated and nitrogen was introduced through the gas feed tube for several hours as a purge. The reaction mixture was filtered to separate the fine particulate precipitate from the bulk of the liquid phase. The volume of the filtrate was 1220 cubic centimeters. The wet filter cake was broken up and dried on the filter by drawing air at room temperature through the solids and the filter for about one day. The product, chlorinated polybutadiene, weighed 111.4 grams, contained 55.1 percent by weight chlorine and had a solubility index of 69.1.

EXAMPLE II

A 3 liter, 4-necked flask equipped with an agitator was charged with 2500 cubic centimeters of solvent consisting essentially of 20 volumetric parts of methylene chloride and 80 volumetric parts of carbon tetrachloride. Seventy grams of polybutadiene having a weight average molecular weight in the range of from 200,000 to 300,000 and having about 98 mole percent cis-1,4-configuration was added in small pieces and dissolved in the solvent. The flask was then equipped with a gas feed tube, a thermometer and an acetone-solid carbon dioxide cooled reflux condenser. An ice-sodium chloride-water bath was brought up to the flask and the solution was purged with nitrogen introduced through the gas feed tube. The nitrogen purge was then discontinued. The temperature of the solution was −0.5° C. and the addition of chlorine through the gas feed tube at a rate of 3.45 grams per minute was begun. After the addition of chlorine had progressed 28 minutes and 43 seconds, the temperature of the reaction mixture was 23° C. and the addition was terminated. A precipitate of fine particles is present in the reaction mixture. Nitrogen was introduced through the gas feed tube for several hours as a purge. The reaction mixture was filtered to separate the precipitate from the bulk of the liquid phase. The wet filter cake was broken up and dried on the filter in the manner of Example I. The product, chlorinated polybutadiene, weighed 148.50 grams, contained 54.6 percent by weight chlorine and had a solubility index of 96.4.

EXAMPLE III

A 3 liter, 4-necked flask equipped with an agitator was charged with 1750 cubic centimeters of methylene chloride and 750 cubic centimeters of 1,1,2-trichloro-1,2,2-trifluoroethane. Fifty grams of polybutadiene having a weight average molecular weight in the range of from 480,000 to 490,000 and having 98 mole percent cis-1,4-configuration was added in small pieces and dissolved in the solvent. The flask was then equipped with a gas feed tube, a thermometer and an acetone-solid carbon dioxide cooled reflux condenser. The solution was purged with nitrogen introduced through the gas feed tube. The nitrogen purge was discontinued. The temperature of the solution was 24° C. and the addition of chlorine through the gas feed tube at a rate of 2.067 grams per minute was begun. After the addition had progressed for 20 minutes and 33 seconds the temperature of the reaction mixture was 37° C. and reflux was observed. After a further 14 minutes and 27 seconds the addition of chlorine was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up and dried on the filter in the manner of Example I. The product, chlorinated polybutadiene, contained 54.3 percent by weight chlorine and had a solubility index of 64.2.

EXAMPLE IV

One hundred fifty grams of polybutadiene having a weight average molecular weight of about 400,000 and having about 98 mole percent cis-1,4-configuration was dissolved, under nitrogen, in 2000 milliliters of toluene. The solution was admixed with 2000 milliliters of methanol to form a first precipitate which was recovered by filtration. The precipitate was then dissolved, under nitrogen, in 2000 milliliters of toluene. The solution was admixed with 2000 milliliters of methanol to form a second precipitate which was recovered by filtration and dried at room temperature in a vacuum oven at an absolute pressure of about 2 inches of mercury for about 4 days. The product was purified polybutadiene.

A 3 liter, 4-necked flask equipped with an agitator and a gas feed tube was charged with 1500 cubic centimeters of solvent consisting essentially of 20 volumetric parts of methylene chloride and 80 volumetric parts of carbon tetrachloride. Thirty grams of the above purified polybutadiene was added to the flask and dissolved in the solvent under nitrogen. The flask was then equipped with a thermometer and an acetone-solid carbon dioxide cooled reflux condenser. The solution was purged with nitrogen introduced through the gas feed tube. The nitrogen purge was discontinued. The temperature of the solution was 28° C. and the addition of chlorine through the gas feed tube at a rate of 2.067 grams per minute was begun. After the addition had progressed for 26 minutes and 18 seconds, the temperature of the reaction mixture was 57° C. and reflux was observed. After a further 6 minutes and 40 seconds the addition of chlorine was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up, washed with water and dried in air for 5 days. The product, chlorinated polybutadiene, contained 57.3 percent by weight chlorine and had a solubility index of 93.0.

EXAMPLE V

A 3 liter, 4-necked flask equipped with an agitator was charged with 1500 cubic centimeters of methylene chloride and 1000 cubic centimeters of 1,1,2-trichloro-1,2,2-trifluoroethane. Seventy grams of a butadiene-styrene A-B-A block copolymer prepared from 72 mole percent butadiene and 28 mole percent styrene was added in small pieces and dissolved in the solvent. The flask was then equipped with a gas feed tube, a thermometer and an acetone-solid carbon dioxide cooled reflux condenser. The solution was purged with nitrogen introduced through the gas feed tube. The nitrogen purge was discontinued. The temperature of the solution was 23° C. and the addition of chlorine through the gas feed tube at a rate of 2.067 grams per minute was begun. After the addition had progressed for about 15 minutes and 30 seconds the temperature of the reaction mixture was 34° C. and a precipitate was observed. After a further 13 minutes the temperature was 36° C. After yet a further 10 minutes and 16 seconds the temperature was 35° C. and the addition of chlorine was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up and dried at room temperature for about 2 days. The product, chlorinated butadiene-styrene block copolymer, contained 47.8 percent by weight chlorine and had a solubility index of 98.7.

Although the present invention has been described with reference to specific details of certain embodiments thereof, it is not intended that such details shouls be regarded as limitations upon the scope of the invention except insofar as they are included in the accompanying claims.

I claim:

1. In a process for producing substantially thermoplastic halogenated butadiene polymer wherein butadiene polymer dissolved in liquid organic solvent is reacted with chlorine, bromine or a mixture thereof, the improvement wherein
    a. said solvent consists essentially of a mixture of one or more prehalogenated alkanes having one to about two carbon atoms and one or more partially halogenated alkanes having one to about two carbon atoms,
    b. fine particles of said substantially thermoplastic halogenated butadiene polymer having a solubility index of at least about 50 precipitate from said solvent during said reaction, and
    c. said precipitated fine particles are separated from the bulk of said solvent.

2. The process of claim 1 wherein the volumetric ratio of said perhalogenated alkane to said partially halogenated alkane in said solvent is in the range of from about 0.4:1 to about 8:1.

3. The process of claim 1 wherein said separation is accomplished by filtration or centrifugation.

4. The process of claim 1 wherein said separated solvent is recycled to said process.

5. The process of claim 1 wherein said substantially thermoplastic halogenated butadiene polymer has a solubility index of at least about 80.

6. The process of claim 1 wherein said substantially thermoplastic halogenated butadiene polymer has a solubility index of at least about 90.

7. The process of claim 1 wherein said substantially thermoplastic halogenated butadiene polymer has a halogen content in the range of from about 5 percent to about 80 percent by weight.

8. The process of claim 1 wherein said reaction is conducted at temperatures in the range of from about $-10°$ C. to about $+150°$ C.

9. The process of claim 1 wherein said reaction is conducted at temperatures in the range of from about 0° C. to about 60° C.

10. The process of claim 1 wherein said reaction is conducted at pressures in the range of from about 0 to about 500 pounds per square inch gauge.

11. The process of claim 1 wherein said butadiene polymer is reacted with chlorine and wherein said substantially thermoplastic halogenated butadiene polymer is substantially thermoplastic chlorinated butadiene polymer.

12. The process of claim 1 wherein said butadiene polymer is polybutadiene having at least about 90 mole percent cis-1,4-configuration.

13. The process of claim 12 wherein said polybutadiene is reacted with chlorine and wherein said substantially thermoplastic halogenated polybutadiene is substantially thermoplastic chlorinated polybutadiene.

14. The process of claim 13 wherein said separation is accomplished by filtration or centrifugation.

15. The process of claim 13 wherein said separated solvent is recycled to said process.

16. The process of claim 13 wherein said substantially thermoplastic chlorinated polybutadiene has a solubility index of at least about 80.

17. The process of claim 13 wherein said substantially thermoplastic chlorinated polybutadiene has a solubility index of at least about 90.

18. The process of claim 13 wherein said substantially thermoplastic chlorinated polybutadiene has a chlorine content in the range of from about 5 percent to about 80 percent by weight.

19. The process of claim 13 wherein said reaction is conducted at temperatures in the range of from about $-10°$ C. to about $+150°$ C.

20. The process of claim 13 wherein said reaction is conducted at temperatures in the range of from about 0° C. to about 60° C.

21. The process of claim 13 wherein said reaction is conducted at pressures in the range of from about 0 to about 500 pounds per square inch gauge.

22. The process of claim 13 wherein said solvent consists essentially of
    a. carbon tetrachloride, and
    b. methylene chloride, chloroform or a mixture thereof.

23. In a process for producing substantially thermoplastic chlorinated butadiene polymer wherein polymer dissolved in liquid organic solvent is reacted with chlorine, the improvement wherein
    a. said butadiene polymer is polybutadiene having at least about 90 mole percent cis-1,4-configuration,
    b. said solvent consists essentially of a mixture of carbon tetrachloride and methylene chloride, c. fine particles of substantially thermoplastic chlorinated butadiene polymer having a solubility index of at least about 50 precipitate from said solvent during said reaction, and d. said precipitated fine particles are separated from the bulk of said solvent.

24. The process of claim 23 wherein the volumetric ratio of said carbon tetrachloride to said methylene chloride in said solvent is about 4:1.

* * * * *

UNITED STATES PATENT AND TRADEMARK OFFICE
CERTIFICATE OF CORRECTION

PATENT NO. : 4,381,374
DATED : April 26, 1983
INVENTOR(S) : Patrick E. Hillman

It is certified that error appears in the above—identified patent and that said Letters Patent is hereby corrected as shown below:

Column 7, line 51, "prehalogenated" should be --perhalogenated--.

Signed and Sealed this

Twelfth Day of July 1983

[SEAL]

Attest:

GERALD J. MOSSINGHOFF

Attesting Officer

Commissioner of Patents and Trademarks